United States Patent [19]

Doumas

[11] Patent Number: 4,780,711
[45] Date of Patent: Oct. 25, 1988

[54] ANTI-ALIASING OF RASTER IMAGES USING ASSUMED BOUNDARY LINES

[75] Inventor: William M. Doumas, Boulder, Colo.

[73] Assignee: International Business Machines Corporation, Armonk, N.Y.

[21] Appl. No.: 722,856

[22] Filed: Apr. 12, 1985

[51] Int. Cl.$^4$ .............................................. G09G 1/16
[52] U.S. Cl. .................................. 340/728; 340/744; 340/747
[58] Field of Search .............. 340/728, 744, 793, 725, 340/703, 730, 747

[56] References Cited

U.S. PATENT DOCUMENTS

| | | | |
|---|---|---|---|
| 4,031,519 | 6/1977 | Findley | 178/30 |
| 4,079,367 | 3/1978 | Yonezawa et al. | 340/728 |
| 4,237,457 | 12/1980 | Houldsworth | 340/728 |
| 4,318,097 | 3/1982 | Oura | 340/728 |
| 4,352,100 | 9/1982 | O'Connell | 340/750 |
| 4,368,463 | 1/1983 | Quilliam | 340/744 |
| 4,400,791 | 8/1983 | Kitado | 340/728 X |
| 4,482,893 | 11/1984 | Edelson | 340/723 |
| 4,486,785 | 12/1984 | Lasher et al. | 340/728 X |
| 4,555,802 | 11/1985 | Fedak et al. | 340/728 X |
| 4,586,037 | 4/1986 | Rosener et al. | 340/728 |
| 4,586,038 | 4/1986 | Sims et al. | 340/725 X |
| 4,591,842 | 5/1986 | Clarke, Jr. et al. | 340/703 X |
| 4,591,843 | 5/1986 | Pratt | 340/728 |
| 4,593,278 | 6/1986 | Koos, Jr. et al. | 340/744 |
| 4,612,540 | 9/1986 | Pratt | 340/728 |

OTHER PUBLICATIONS

"Digital Typography", *Scientific American*, Aug. 1983, Charles Bigelow, pp. 106-119.

*Primary Examiner*—Gerald L. Brigance
*Attorney, Agent, or Firm*—Ratner & Prestia

[57] ABSTRACT

A method for improving the quality of raster imaging in which an array of pels is selected having a pattern of filled and unfilled pel positions. In the selected array, an assumed line is determined based on its pel pattern by comparing the pel pattern of the selected array with respect to a plurality of predetermined pel patterns each having a predetermined associated line and angle. When a match is found, the assumed line of the selected array is determined as the associated line of the matched predetermined array. The intensity of the pel at the center of array is selected in accordance with the angle of the line. The line, at the predetermined angle, is positioned to bisect the pel to be enhanced. Intensity is determined by the relative areas of the portions of the bisected pel.

18 Claims, 7 Drawing Sheets

_Fig. 6_

_Fig. 7A_

_Fig. 7B_

_Fig. 7C_

_Fig. 7D_

| COL. 1 | COL. 2 |
|---|---|
| ROTATION | TRANSPOSITION |
| P1,1 → P3,1 | P1,1 → P1,3 |
| P1,2 → P2,1 | P1,2 → P1,2 |
| P1,3 → P1,1 | P1,3 → P1,1 |
| P2,1 → P3,2 | P2,1 → P2,3 |
| P2,2 → P2,2 | P2,2 → P2,2 |
| P2,3 → P1,2 | P2,3 → P2,1 |
| P3,1 → P3,3 | P3,1 → P3,3 |
| P3,2 → P2,3 | P3,2 → P3,2 |
| P3,3 → P1,3 | P3,3 → P3,1 |

*Fig. 8*

ANTI-ALIASING OF RASTER IMAGES USING ASSUMED BOUNDARY LINES

DOCUMENTS INCORPORATED BY REFERENCE

1. U.S. Pat. No. 4,031,519 by Gerald I. Findley, issued Nov. 11, 1974.
2. "Digital Typography," Charles Bigelow, *Scientific American*, August 1983.

FIELD OF THE INVENTION

This invention relates to anti-aliasing in a visual display of graphic patterns and in particular to an image represented by selected square arrays of pels.

BACKGROUND OF THE INVENTION

For an image to be reproduced on a raster image device, the image must be sampled to provide raster scan data. Therefore, an image is scanned in a linear manner and sample points which are light may be represented by a 0, and sample points which are dark may be represented by a 1. This scan is repeated over the entire surface of the image to be displayed producing raster scan data in which each bit represents a sample point within the image.

The raster scan data is transmitted to a raster display device such as the printer shown in U.S. Pat. No. 4,031,519 by Findley. In such devices a laser beam writes out the image of the text by setting up a pattern of electrostatic charge on a belt or drum according to the raster scan data, thus the data is converted into an image.

When an edge of an image reproduced on such a device is at an oblique angle with respect to the direction of the raster scan, jagged spots are produced in the image. This problem is called aliasing. An anti-aliasing technique is disclosed in U.S. Pat. No. 4,079,367 by Yonezawa et al which shows detection of two adjacent pels positioned in an oblique direction and the insertion of an additional pel to smooth a jagged portion. Yonezawa et al use a sliding window to examine matrices of pels for such oblique pairs of pels. However, Yonezawa et al has limitations in anti-aliasing on more complex configurations of pels.

It is also known to write a gray or halftone halo along the periphery of images reproduced from raster scan data. This non-selective printing of a gray pel at all edges creates a halo around the image thereby smoothing the image and enhancing resolution. Further, *Architectures and Algorithms for Parallel Updates of Raster Scan Displays;* Satish Gupta; Carnegie-Mellon University, Department of Computer Science; December, 1981, teaches the selection of pel intensity depending upon the distance between the center of the pel and the edge of the image. Gupta also shows a table look up to make anti-aliasing computations more efficient. "Digital Typography", Charles Bigelow, *Scientific American*, August, 1983, also shows the selection of one of a plurality of gray levels to enhance edges.

It is also known to shift pels a half pel position when printing diagonals as described, for example, in "Character Edge Smoothing for Matrix Printing" by D. L. Ort in the *Xerox Disclosure Journal,* Volume 6, Number 1, January/February 1981.

A more precise technique which shifts selected pels one half position is shown in U.S. Pat. No. No. 4,232,342 by R. Sommer in which a pel is shifted or not shifted depending on its position relative to the desired contour.

SUMMARY OF THE INVENTION

A control for a visual display of graphic patterns represented by arrays of pels. An array having both foreground and background pels is selected and the representation of a line between the foreground and background pels is established in response to the pel pattern in the selected array. A modified pel intensity for a pel within the selected array is determined in accordance with the established line. A visual display device generates pels having foreground, background or modified intensity to produce a display of the graphic pattern.

BRIEF DESCRIPTION OF THE FIGURES

FIGS. 3A–Q show pel patterns having associated lines whose angles are multiples of 45°.

FIGS. 4A–Q show pel patterns having associated lines with angles intermediate those of the lines of FIGS. 3A–Q.

FIGS. 7A–H show pel patterns for line images having angles which are multiples of 45° and their intermediate lines.

DETAILED DESCRIPTION OF THE INVENTION

Figure 1A:
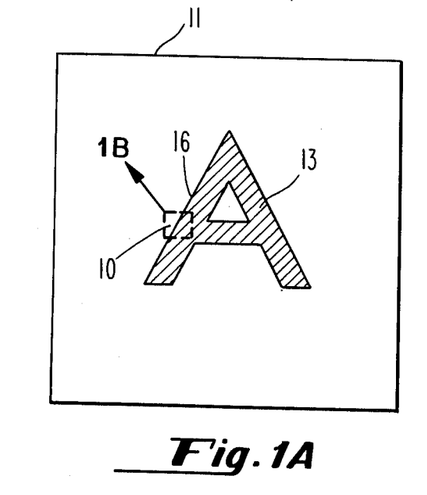
FIG. 1A shows a raster display device displaying an image.

Referring now to FIG. 1A, there is shown a raster image display 11. Display 11 is a graphic presentation device for displaying typical graphic patterns and graphic images such as image 13 by conventional raster imaging techniques. Image 13 has an apparent edge 16 which passes through display portion 10 at an angle to the horizontal and vertical edges of display 11. As well known, it is during raster image display of edges having such angles that aliasing causes an image edge such as edge 16 to be jagged rather than smooth. Therefore anti-aliasing techniques may be performed upon apparent edge 16 of image 13 to improve its quality.

Figure 1B:
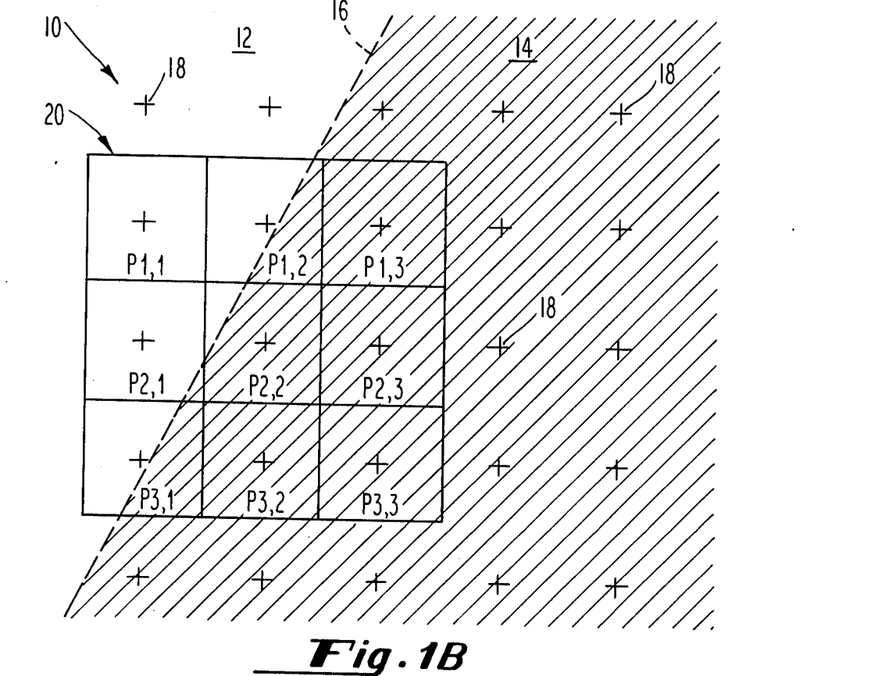
FIG. 1B shows an array within a portion of the image of FIG. 1A.

Raster image display portion 10 is shown in more detail in FIG. 1B and comprises five rows and five columns of pixels or pels 18. Conventional pels 18 are discrete picture elements of image display 11 which may be dark, light, or have intermediate intensities to form an image on display 11. Each pel 18 has a geometric domain which may be, for example, square, circular or elliptical. The geometric center of each pel 18 is indicated in FIG. 1B by a "+." Within portion 10 there may be defined a square 3×3 array 20 of pels P1,1–P3,3. Each pel within array 20 may be referenced by its row and column address. For example P2,1 is in row 2, column 1.

When a pel 18 is displayed, its entire domain must be displayed at the same intensity even if apparent edge 16 passes through it. Thus, when a portion of a raster scan image, such as portion 10, is enlarged to the extent that the pel domains of pels 18 may be viewed, as in FIG. 1B, it will be understood by those skilled in the art that edge 16 is not straight. Rather, the boundary between background 12 and foreground 14 is a jagged line formed by the edges of a plurality of pels 18. Thus apparent boundary line or edge 16 represents the position which the boundary of image 13 would occupy of the raster scan data had infinite resolution and there were no jagged edges and is therefore shown as dotted line 16 in FIG. 1B.

Pels 18 whose domains are to the right of edge 16 are entirely within foreground 14 and are printed dark. For example, pels P1,3, P2,3, P3,2 and P3,3 within array 20. Pels 18 whose domain is entirely within background 12 are printed light. For example pel P,1.

Apparent edge 16 also passes through the domain of several pels 18. The domains of these pels lie partially in foreground 14 and partially in background 12. For example, edge 16 passes through pels P1,2, P2,1, P2,2 and P3,1 which are shown in FIG. 1B in an idealized manner in which the pel portions in foreground 14 are shown shaded and the pel portions in the background 12 are not shaded. However, during the actual display of image 13, the entire domain of each pel 18 has the same intensity.

Pels 18 whose domain is bisected by edge 16 may be enhanced to smooth the jagged edges by selecting a shade of gray intermediate the unfilled and the filled pel intensities to optimize anti-aliasing. To determine the shade of gray for enhancement of each pel P1,2, P2,1, P2,2, and P3,1 the particular array of pels is selected which has that particular pel at its center. For example, the pel pattern of array 20 would be used to enhance pel P2,2 which is at its center. In another example, to enhance pel P1,2 the 3×3 array would comprise P2,1, P2,2, P2,3; P1,1, P1,2, P1,3 and the respective pels above P1,1, P1,2 and P1,3.

Figure 2:
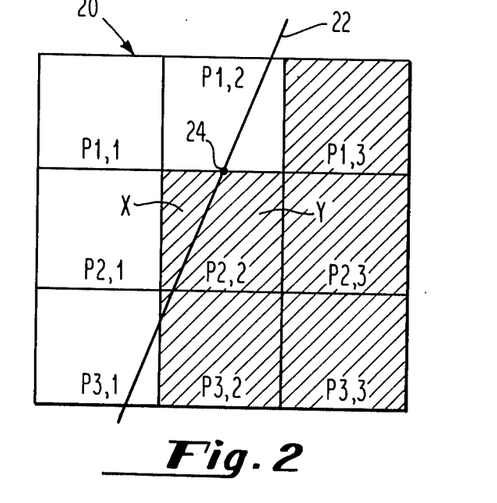
FIG. 2 shows the array of FIG. 1B by itself.

Referring now to FIG. 2, array 20 of FIG. 1B is shown alone. An assumed boundary line 22 is shown bisecting array 20. Assumed boundary line 22 is to be distinguished from apparent edge 16 which separates background 12 and foreground 14 of image 13 as shown in FIG. 1B. Assumed boundary line 22 is an approximation of a portion of edge 16 based upon the arrangement of pels within array 20. Thus assumed boundary line 22 is a reconstruction of apparent boundary line 16 based upon raster scan data in which all pels P1, 1–3,3 are entirely filled or entirely unfilled. An angle associated with line 22 is measured counterclockwis from the upper horizontal edge of array 20.

Array 20 has three rows and three columns. Because the entire domain of a pel 18 must be displayed at the same intensity, pels P1,1, P1,2, P2,1 and P3,1 are shown light or unfilled since the majority of their areas are to the left of apparent edge 16 of FIG. 1B. Pels P1,3, P2,2, P2,3, P3,2 and P3,3 are shown dark or filled because the majority of their areas are to the right of apparent edge 16. Thus before enhancement, each pel is either filled or unfilled depending on which side of edge 16 its center lies. The jagged edge between the filled and unfilled areas of array 20 is formed by the left vertical edges of pels P1,3, P2,2 and P3,2 and the upper horizontal edge of pel 2,2.

Assumed boundary line 22 is positioned to pass through a point 24 which is at the center of the upper horizontal edge on the pel being enhanced, viz, center pel P2,2. Depending on the angle of assumed boundary line 22 with respect to the horizontal edge of array 20, a certain percentage of pel P2,2 is on the left of boundary line 22 and a certain percentage is on the right. A determination is made of the percentage of pel P2,2 which is to the right of assumed boundary line 22. To enhance pel P2,2, pel P2,2 is printed at a percentage of full intensity which is equal to the percentage of pel P2,2 which lies to the right of assumed boundary line 22.

As previously described, the arrays which form image 13 may contain a number of different pel patterns. As each array in turn is selected to be enhanced, it is compared against each of the patterns shown in FIGS. 3A–Q and 4A–Q. Each pattern in FIGS. 3A–Q, 4A–Q has a predetermined line and angle associated with it. If a match is found, the assumed boundary line 22 of the selected array is established as the line associated with the matched array. As described above, once the line associated with the matched array is determined, the pel intensity is selected in accordance with the angle of the determined line.

As will later be described in detail, the pel patterns shown in FIGS. 3A–Q have angles which are multiples of 45° measured from the horizontal edges of the arrays 20. For example, FIGS. 3A,B show arrays with pel patterns having a line with an associated angle of 0°. Each has a top row which is unfilled and has a filled pel area with an edge which is parallel to the horizontal line of the matrix. FIGS. 3C,D show arrays having filled pel areas whose edges are on the diagonal or parallel to the diagonal of the arrays. Thus arrays 3C,D are 45° patterns and the assumed boundary line 22 associated with them has an angle of 45°.

As will later be described in more detail, each of the remaining arrays in FIGS. 3A–Q may be formed by rotating the arrays in FIGS. 3A,B and 3C,D. For example, 90° counterclockwise rotation of the 0° arrays 3A,B produces the 90° arrays of FIGS. 3E,F. A second 90° rotation, performed upon the 90° arrays of FIGS. 3E,F, establishing the 180° lines shown in FIGS. 3I,J. A 90° rotation of the arrays shown in FIGS. 3I,J like-wise produces the 270° lines associated with the arrays shown in FIGS. 3M,N.

Similarly, three consecutive counterclockwise 90° rotations may be performed on the 45° arrays of FIGS. 3C,D and their associated lines. The first 90° counterclockwise rotation of the arrays of FIGS. 3C,D produces the arrays of FIGS. 3G,H each having an associated line of 135°. A second rotation produces the 225° arrays of FIGS. 3K,L and a third rotation produces the 315° arrays of FIGS. 3P,Q.

FIGS. 4A–Q show pel patterns having associated angles intermediate between those of FIGS. 3A–Q. For example, the angle of the line associated with the patterns of FIGS. 4A,B is 22.5°, intermediate between the 0° and 45° patterns of FIGS. 3A,B and 3C,D. FIGS. 4A,B have top rows which are unfilled and bottom rows which are filled. Pel patterns with angles intermediate between 0° and 45° are those in which each row is filled with at least as many pels as the row above it.

Transposing the arrays of FIGS. 4A,B around a verticle line at the center of the array and rotating the resultant pattern 90° counterclockwise produces the arrays of FIGS. 4C,D. The arrays of FIGS. 4C,D have angles of 67.5°, intermediate between 45° and 90°.

In a manner similar to that described for the arrays of FIGS. 3A–Q, FIGS. 4A–D may be rotated to produce the remaining arrays of FIGS. 4A-Q. A counterclockwise 90° rotation of FIGS. 4A,B produces the arrays of FIGS. 4E,F. A second 90° rotation produces the arrays of FIGS. 4K,L and a third produces the arrays of FIGS. 4P,Q.

A 90° counterclockwise rotation of the arrays of FIGS. 4C,D produces the arrays of FIGS. 4G,H. A second and a third rotation produce the arrays of FIGS. 4I,J and 4M,N respectively.

Each array pel pattern of FIGS. 3A-Q, 4A-Q thus has an associated line with an associated angle. For example, the arrays of FIGS. 4M,N have an associated line with an angle of 292.5°. When a 3×3 array 20 is selected to enhance a raster image, it is compared against each of the arrays of FIGS. 3A-Q and 4A-Q. If a match is found, the center pel P2,2 of the selected array is enhanced. If no match is found, then no enhancement is performed. Thus when an array from FIGS. 3A-Q, 4A-Q is found which matches the selected array 20, the assumed boundary line 22 of the selected array 20 is also determined. The assumed boundary line 22 of the selected array 20 is the line associated with the array of FIGS. 3A-Q, 4A-Q which matched the selected array 20.

Assumed boundary line 22 is positioned to bisect the center pel P2,2 of array 20 at the determined angle. The preferred placement of the assumed boundary line 22 is at point 24, the center of the upper horizontal edge which is understood to be the optimum placement. However, the optimum placement or positioning of the line may be adjusted in accordance with pel geometry. Thus the position of line 22 may be varied to the left or to the right of point 24.

When boundary line 22 is positioned and center pel P2,2 is bisected, two portions of pel P2,2 are produced. These two portions are center pel portion X which lies to the left of assumed boundary line 22 and center pel portion Y which lies to the right of assumed boundary line 22. Thus pel portion Y lies closer to the filled pel area of image 13 than pel portion X. A determination is made of the percentage of the total area of pel P2,2 which pel portion Y constitutes. Assumed boundary line 22 has zero width and, therefore, cannot occupy any area. This percentage may be given as the area of Y divided by the sum of the areas of X plus Y. This calculated percentage determines the intensity at which the entire area of pel P2,2 is printed. For example, if pel portion Y forms two-thirds or the total area of pel P2,2 then the entire area of pel P2,2 is printed at two-thirds of its full intensity.

Referring now to FIGS. 3A-Q in more detail, the angle of an assumed boundary line 22 is established for pel patterns with assumed angles which are multiples of 45°. The angles are measured counterclockwise from the horizontal edge in the preferred embodiment. However, the angles of FIGS. 3A-Q, 4A-Q may be measured from any multiple of 90° in either a clockwise or counterclockwise direction. All pel patterns shown in FIGS. 3A-Q, 4A-Q represent the edge of an image such as image 13 of FIG. 1. All such edge images contain only filled pels on one side of the edge and only unfilled pels on the other side. The pel geometry shown for each pel in FIGS. 3A-Q, 4A-Q is square. However, pel enhancement using an assumed boundary line 22 may be performed on any pel geometry including circular and elliptical pels. Additionally assumed line 22 enhancement may be performed on overlapping pels.

FIG. 3A shows a pel pattern in which row 1 is unfilled and rows 2 and 3 are filled. The boundary between the unfilled pel area of row 1 and the filled pel area of rows 2 and 3 is thus perfectly horizontal and this pattern is defined to have an assumed boundary line 22 with an angle of 0°. FIG. 3B shows a pel pattern which is also defined as 0°. Rows 1 and 2 are unfilled and row 3 is filled. Thus the boundary line between the unfilled and filled pels is parallel to the line of FIG. 3A. FIGS. 3A,B show the only two patterns which may be defined to be 0° for a 3×3 array since an array which is entirely filled or entirely unfilled would have no edge and thus would not be assigned an angle.

The patterns shown in FIGS. 3A-Q represent only 3×3 arrays. However, it will be seen by those skilled in the art that these angles may be defined for any n×n array. In a larger array additional 0° lines may be established. For example a 5×5 array may have 0° arrays in which the top row only, the top two rows, the top three rows or the top four rows are unfilled. A 0° associated line may be established for any array which has a completely unfilled top row if the boundary line formed by edges of the filled pels is horizontal.

In FIG. 3C pels P1,1, P1,2 and P2,1 are unfilled. The remaining pels are filled. Filled pels thus form a diagonal connecting the lower left pel P3,1 with the upper right pel P1,3. All pels to the right of this diagonal are filled. The array of FIG. 3C is thus a diagonal array. The pel pattern of FIG. 3C is thus defined to have an angle of 45°.

In FIG. 3D pels P2,3, P3,2 and P3,3 are filled and the remaining pels are unfilled. This pattern is the same as the pattern of FIG. 3C except that the diagonal pels P1,3, P2,2 and P3,1 are unfilled. Thus the assumed boundary line 22 of the pel pattern of FIG. 3D is parallel to that of FIG. 3C and has an angle of 45°. In general the 45° angle arrays for any n×n array may be formed by filling an array to form a filled pel area whose edge is parallel to the diagonal but does not lie to the left of the diagonal. In the 3×3 array only two pel patterns may be 45° arrays. In the generalized n×n example, there may be more than two 45° arrays.

FIGS. 3E,F may be produced by rotating counterclockwise the patterns of FIGS. 3A,B, respectively, by 90° as previously described. This results in a pel pattern in which column 1 is light and columns 2 and 3 are dark for FIG. 3E and a pel pattern in which columns 1 and 2 are unfilled and column 3 is filled for FIG. 3F. A boundary line separating the unfilled areas from the filled areas is vertical and would thus have an angle of 0°+90°=90°. In this rotation, the array of FIG. 3A is rotated to produce the array of FIG. 3E and the array of FIG. 3B is rotated to produce the array of FIG. 3F. In the general n×n case, in which there may be more than two 0° arrays, each unique 0° array may be rotated 90° to produce a unique 90° array.

In a similar fashion, FIGS. 3G,H may be produced by rotating FIGS. 3C,D counterclockwise 90° respectively. Thus the pel patterns shown in FIGS. 3G,H are defined to have an angle of 45°+90°=135°. In the n×n case, if there are more than two 45° arrays, more than two 135° arrays are possible.

All 0° pel patterns may be rotated 180° to produce 180° arrays. Thus, in the 3×3 example, pel patterns of FIGS. 3I,J may be produced by rotating the 0° pel patterns of FIGS. 3A,B counterclockwise 180° to produce arrays having associated lines of 180°. Similarly, the 0° pel patterns of FIGS. 3A,B may be rotated counterclockwise 270° to produce the 270° lines of FIGS. 3M,N.

The pel patterns of FIGS. 3K,L may be produced by rotating counterclockwise the pel patterns of FIGS. 3C,D 180° to produce lines of 225°. The pel patterns of FIGS. 3C, D may be rotated counterclockwise 270° to produce the 315° lines of 3P,Q. Thus all the arrays of FIGS. 3E-Q may be established by successively rotating the arrays of FIGS. A-D counterclockwise 90°.

Figure 3:
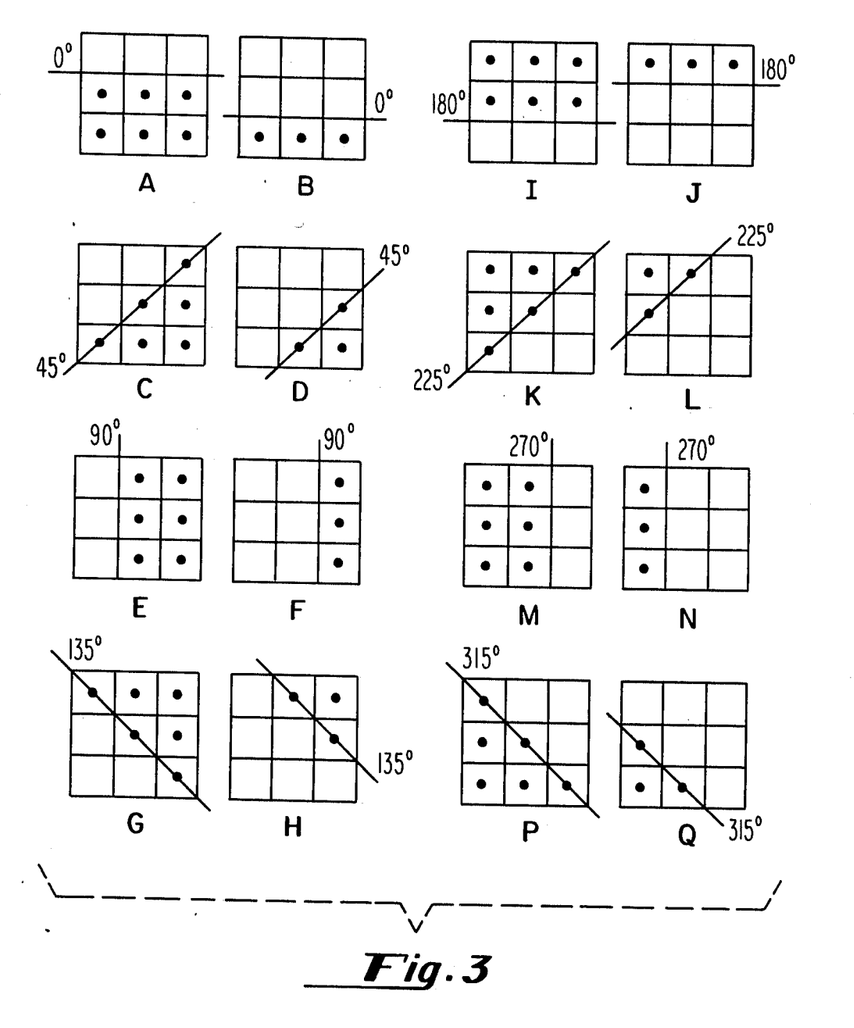

All patterns which may be assigned an assumed boundary line 22 having an angle which is a multiple of 45° are shown in FIG. 3. This definition process may be performed on any size array and requires the recognition of pel patterns which are horizontal or diagonal and the rotation of these patterns.

FIGS. 4A-Q show pel patterns whose angles are intermediate between those of the pel patterns of FIGS. 3A-Q. The resolution possible in a 3×3 array does not render the definition of more than one intermediate angle meaningful. However, for larger arrays a plurality of intermediate angles may be defined. For example, if two intermediate lines are meaningful they may be defined to have angles of 30° and 60°. The angles of FIGS. 4A-Q are defined to be halfway between their nearest angles in FIGS. 3A-Q since only one intermediate angle is defined in the 3×3 example.

FIGS. 4A,B show arrays whose associated lines have an angle of 22.5°. This angle is half way between the corresponding arrays of FIGS. 3A,B and 3C,D which had associated lines of 0° and 45°, respectively. To produce the arrays shown in FIGS. 4A,B and in general to produce the angles intermediate between 0° and 45° for any n×n array, the diagonal array such as that shown in FIG. 3C may be used. All pels are removed from the top most row leaving it completely unfilled. The bottom-most row is required to remain completely full. Pels may then be removed from each row between the top-most row and the bottom-most row moving from left to right, such that there remains a number of filled pels on each row which is at least as large as the number of filled pels above it. In this manner a plurality of different intermediate angles may be produced. Arrays which fall into the definition of a 0° array must be eliminated. As shown in FIGS. 4A,B there is only one intermediate angle in the 3×3 case, 22.5°, and there are two arrays which are associated with it.

The next intermediate angle to be established is the one between 45° and 90°. In the 3×3 case only one such intermediate angle is chosen and it is 67.5°. As previously described the 67.5° arrays shown in FIGS. 4C,D may be produced by transposing the arrays of FIGS. 4A,B about a vertical axis and rotating the resultant array 90° counterclockwise. In the 3×3 example, the transposition may be performed by swapping the first and third columns of an array. If there is more than one intermediate angle defined between 0° and 45°, each may be transposed and a corresponding plurality of angles intermediate between 45° and 90° may be produced.

The arrays of FIGS. 4A-D may then be rotated successively three times counterclockwise 90° to produce arrays 4E-Q in the manner previously described for arrays 3E-Q. The first rotation of the arrays of FIGS. 4A,B produces the 112.5° arrays of FIGS. 4E,F. The second and third produce the 202.5° arrays of FIGS. 4I,J and the 292.5° arrays of FIGS. 4M,N. The first rotation of the arrays of FIGS. 4C,D produces the 157.5° arrays of FIGS. 4G,H. The second and third rotations produce the 247.5° arrays of FIGS. 4K,L and the 337.5° arrays of FIGS. 4P,Q.

The transpositions and rotations required to produce the arrays of FIGS. 4A-Q, as well as the arrays of 3A-Q, may be performed by conventional computer aided design software and image processing software. With computer assistance, arrays may be visually displayed, rotated or transposed, and the results observed. Additionally the associated line of an array, and its angle, may be rotated and observed.

Additionally, rotation and transposition may be performed by logic in hardware form. To implement an array rotation using hardware, a first set of nine latches may be used to represent the nine pels of an array which is to be rotated, each latch representing one pel within the array and storing a 1 if the pel is filled and a 0 is the pel is unfilled. These latches may be arranged into a 3×3 pattern to represent the rows and columns of the array to be rotated.

The outputs of the first set of nine latches may be connected to the inputs of a second set of nine latches in a 3×3 array which represents the array that results from the rotation. The sets of latches are connected in the manner shown in column 1 of FIG. 8. For example, the output of the latch representing P1,1 in the first set of latches is connected to the input of the latch representing P3,1 of the second set of latches because a pel in a position P1,1 is transferred to position P3,1 by rotating an array. In a similar manner the remaining eight latches are connected according to FIG. 8. When the outputs of the nine latches in the first set of latches are latched into the second set of latches, the second set represents an array which is a 90 degree rotation of the array represented by the first set.

Figure 8:
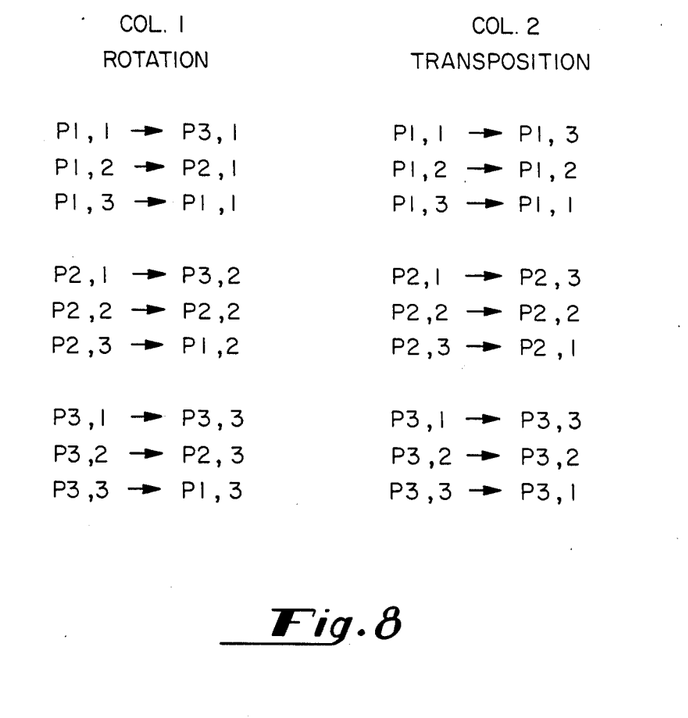
FIG. 8 shows the pel position transfers required to rotate and transpose a 3×3 array of pels.

By connecting the output of the first set of latches to a third set of nine latches in a 3×3 array according to column 2 of FIG. 8, the latches may perform a transposition of the starting array. for example, the output of the latch representing P1,1 of the starting array is connected to the input of the latch representing P1,3 of the third set of latches. A pel in position P1,1 is transferred to position P1,3 by transposition. Thus whether a rotation or a transposition is performed the output of the latch representing a starting position is connected to the input of a latch representing the position to which it is transferred by the operation.

An assumed angle such as those shown in FIGS. 3A-Q, 4A-Q may also be established for pel patterns as shown in FIGS. 7A-H which represent line images within an array 20. The line images of FIGS. 7A-H are to be distinguished from the edge images of FIGS. 3A-Q, 4A-Q. Line images are representations of lines which pass through an array 20 and appear as arrays which have unfilled pel areas on two sides of the filled pel areas. In FIGS. 3A-Q, 4A-Q which show edge images, all filled pel areas have unfilled pel areas on one side only.

Figure 7A:
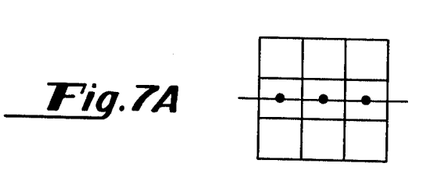
Figure 7B:
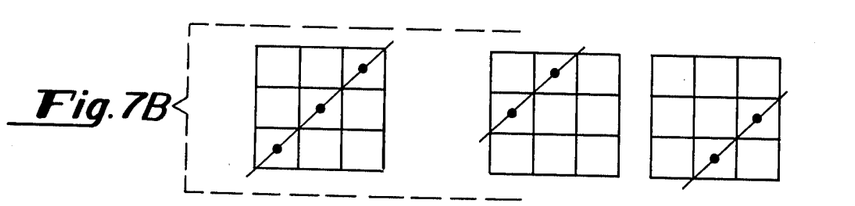
Figure 7C:
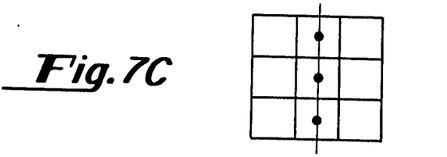
Figure 7D:
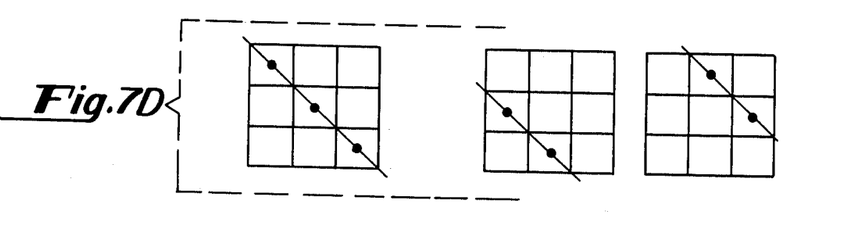
Figure 7E:
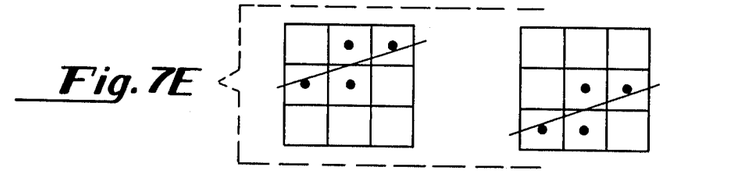
Figure 7F:
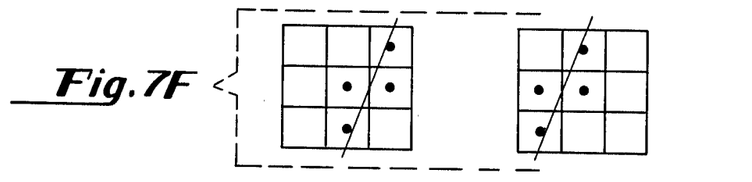
Figure 7G:
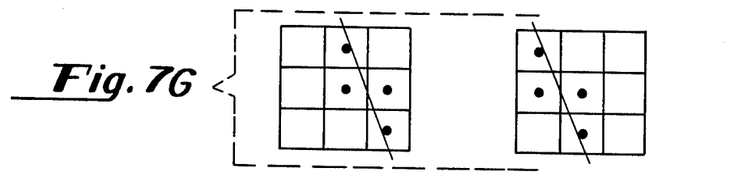
Figure 7H:
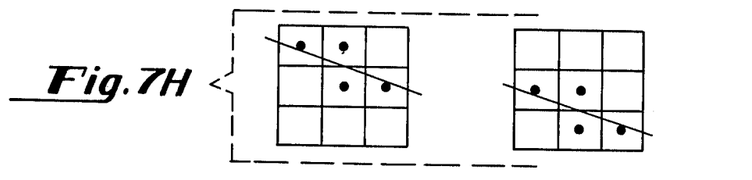

FIG. 7A shows a horizontal line image passing through an array at 0° and is defined as a 0° or 180° line. FIG. 7B shows three arrays having line images, a diagonal line image and two line images parallel to a diagonal line. These lines therefore have an angle of 45° or 225°. Each line in a line image array represents two angles. The angle defined and a 180° rotation of the angle defined. These are actually the same line.

FIG. 7C results from a 90° counterclockwise rotation of the 0° array of FIG. 7A and has an angle of 90° or 270°. Similarly, the arrays of FIG. 7D may be produced by 90° counterclockwise rotations of the arrays of FIG. 7B and have an angle of 135° or 315°.

FIGS. 7E-H represent angles intermediate between those of FIGS. 7A-D. The pel patterns of FIGS. 7E-H may be produced by conventional line drawing algorithms which convert vector data to raster form. The angle established for each pel pattern is the angle of the vector chosen for conversion by the line drawing algorithm. The arrays of FIG. 7E have angles of 22.5° or 202.5°. The arrays of FIG. 7F have angles of 67.5° or 247.5°. FIGS. 7G,H show arrays of 112.5° or 292.5° and 157.5° or 337.5°, respectively.

To enhance the center pel of an array 7A-H, the intensity of the pel to be enhanced is determined by the angle of the assumed boundary line 22. The angle of the assumed boundary line 22, which is the angle of the vector, is an approximation of the angle of the line image. During enhancement of line images assumed boundary line 22 is defined to have a non-zero width which may be approximately one-half the width of a pel. The percentage of full intensity of the enhanced pel is the ratio of the area of the pel overlapped by assumed boundaryline 22 to the area of the entire pel.

The pels of the arrays of FIGS. 3A-Q, 4A-Q and 7A-H may be represented as binary bits of data in which a filled pel may be represented by a 1 and an unfilled pel may be represented 0. Furthermore, image 13, as previously described for FIG. 1A, may be represented in conventional manner as binary bits and these binary bits may be processed for image enhancement using assumed boundary lines 22. Therefore, as known in the art, an image which is to be displayed on raster image display 11 is digitized to produce raster scan data.

To enhance the quality of the display on raster image display 11 using assumed boundary line 22 the raster scan data must be converted into arrays 20. Raster scan data is one dimensional data in the form of a sequence of 8 bit bytes in which each bit represents one pel and may be on or off depending on whether the pel it represents is filled or unfilled. When these bits are converted to the form of an array 20, they may be used to access a location in a ROM or PLA decoder. The location accessed contains intensity information for the pel within array 20 to be enhanced. This intensity information may be determined as a percentage of full intensity which is equal to the percentage of P2,2 formed by Y as shown in FIG. 2.

Figure 5:
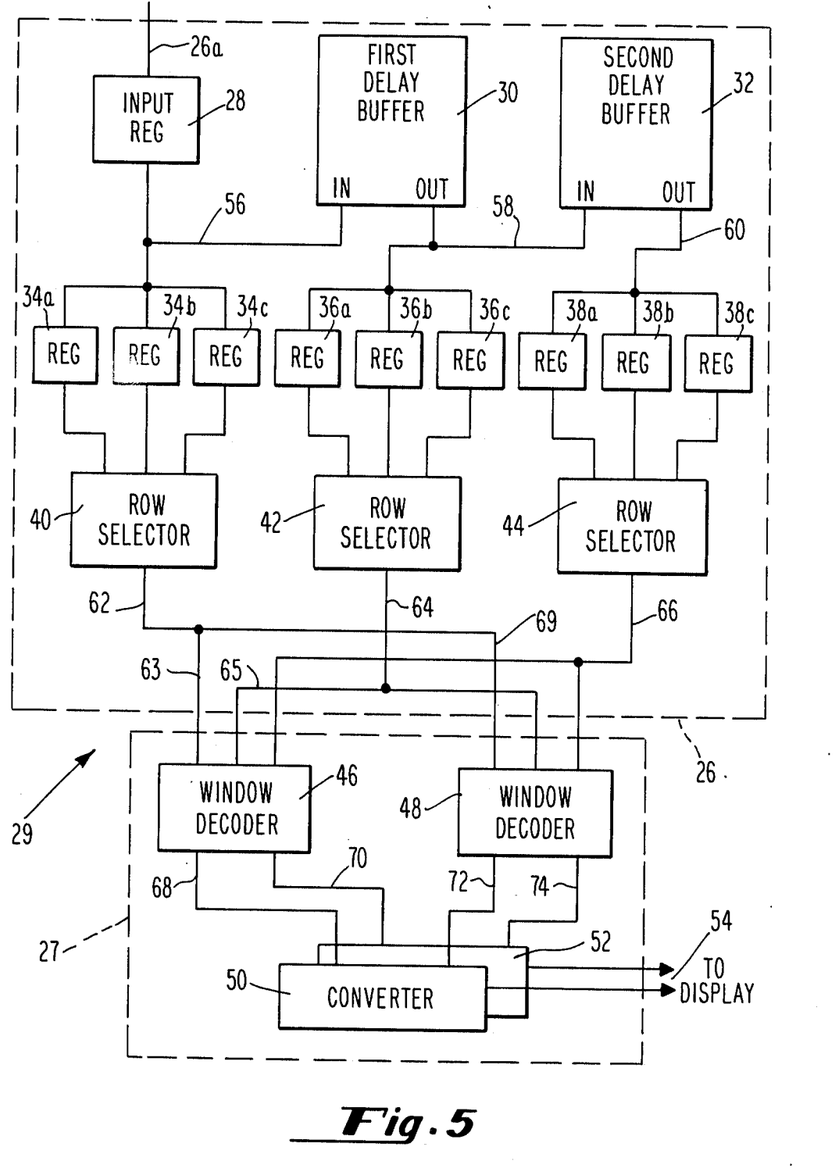
FIG. 5 illustrates in block diagram form a frame generator and a decoder for generating arrays and enhancing pels.

FIG. 5 illustrates a block diagram of quality enhancement data flow 29 which includes a frame generator 26 and a decoder 27. Unenhanced raster scan data, from a scanning and digitizing device, in serial form is applied to frame generator 26 by way of a line 26a, and after receiving assumed line enhancement by frame generator 26 and decoder 27, the enhanced raster scan data is applied to display 11 by way of output 54.

Frame generator 26 receives raster scan data in serial form and generates a series of 3×3 arrays 20. The 3×3 arrays 20 generated by generator 26 represent a window of the display on a raster display 11. Frame generator 26 may produce two different arrays 20 simultaneously to permit parallel processing of arrays, thereby increasing the speed of enhancement.

Window decoder 46 receives the 3×3 arrays 20 generated by frame generator 26 and performs enhancement of the center pel of each array 20. Decoder 27 performs this enhancement by matching the pel patterns of the arrays generated by generator 26 with the predetermined pel patterns which require enhancement according to assumed boundary line enhancement as described above. If a match is found the intensity of the modified pel is determined by the percentage of the modified pel which lies to the right of the assumed boundary line 22 whose angle is chosen according to FIGS. 3A-Q, 4A-Q. Whether a pel is modified or not, decoder 27 transmits its intensity information to a visual display device such as display 11.

To receive and convert the raster scan data, frame generator 26 of quality enhancement data flow 29 shown in FIG. 5 includes an input register 28. Input register 28 stores this data and outputs it, one byte at a time, to first delay buffer 30 and registers 34a,b,c. Registers 34a,b,c each hold one of three successive bytes of raster scan data.

When the first byte of raster scan data is received in input register 28, it is loaded into register 34a of row selector 40. It is also written into the zero location of first delay buffer 30 using line 56. First delay buffer 30 is a circular buffer with a length of 420 bytes. This length is chosen to correspond to the number of bytes of raster scan data produced for one raster scan and it depends on the width of the printing paper and the sampling rate. Second delay buffer 32 is also a circular buffer with a length of 420 bytes. Buffers 30, 32 may be eight bit memories with a binary counter to serve as an address register. Both buffers 30, 32 begin with their address register zeroed.

When input register 28 loads data into register 34a, the addressed byte of each buffer 30, 32 is simultaneously loaded into a register. The contents of location zero of buffer 30 are written into register 36a of row selector 42 and the contents of location zero of buffer 32 are written into register 38a of row selector 44. After the loading of registers 34a, 36a and 38a the input register byte is written into location zero of first buffer 30, and byte zero from first delay buffer 30 is written into location zero of second delay buffer 32 by line 58. The address register of delay buffers 30,32 is incremented to 1.

A second byte of data is then loaded into input register 28. When the second byte of raster scan data is received by input register 28, it is loaded into register 34b of row selector 40. At the same time, the addressed byte of first delay buffer 30, byte one, is written into register 36b of row selector 42 and the addressed byte of second delay buffer 32 is written into register 38b. The byte stored in input register 28 is then written into location one of first delay buffer 30 and the contents of location one of first delay buffer 30 are written into location one of delay buffer 32. The address register is then incremented to two.

This process is then repeated a third time. A third byte of scan data is received in input register 28 and this byte of data is written to register 34c. Simultaneously, the addressed byte of each buffer 30,32 is loaded into a register. The contents of location two of buffer 30 are written to register 36c and the contents of location two of buffer 32 are written into register 38c. The byte stored in input register 28 is then written into location two of buffer 30 and the contents or location two in buffer 30 are written to location two of buffer 32. The address register is incremented to three and a fourth byte of scan data is loaded into input register 28.

The first three bytes of the scan input data are therefore stored in registers 34a,b,c. Additionally, they are stored at locations zero, one, and two of delay buffer 30. Since circular delay buffer 30 is 420 bytes long, the first three bytes of scan data are loaded into registers 36a,b,c 420 cycles later than they are loaded into registers 34a,b,c. When they are written to registers 36a,b,c, they are simultaneously loaded into second delay buffer 32. Since second delay buffer 32 is also 420 bytes long, it delivers the first three bytes of scan data to registers 38a,b,c 420 cycles after delivery to registers 36a,b,c.

After a sufficient number of cycles, registers 34a,b,c, 36a,b,c and 38a,b,c contain a window or frame of the input scan data received by input register 28. Taken together, registers 34a,b,c contain the 24 most recently received bits of scan data. Registers 36a,b,c contain 24 bits which were received by input register 28 420 byte cycles prior to the data in registers 36a,b,c. Since each scan line is 420 bytes wide, the 24 bits of data in registers 36a,b,c represent the pels of display 11 which are directly above the pels represented by the bits in registers 34a,b,c. Similarly the bits in registers 38a,b,c were delayed an additional 420 byte-cycles beyond those of registers 36a,b,c and represent the scan data of the line immediately above registers 36a,b,c. Thus registers 34a,b,c, 36a,b,c, and 38a,b,c form a window or frame of the raster scan data.

Row selector 40 selects four bits at a time successively from registers 34a,b,c. Row selector 40 may be a conventional data selector with a twenty-four bit input and logic for selecting which input bits are transmitted to its output at line 62. This selection logic may be responsive to a binary counter. The first time row selector 40 selects bits from register 34a, it selects the first four bits starting with the first bit of register 34a. The second time it skips a bit and selects four bits starting with tne third bit of register 34a. This process of overlapping selection continues until it crosses over to register 34b. The process then continues through registers 34b,c. Before row selector 40 reaches the end of register 34c, a new byte from input register 28 is loaded into 34a and row selector 40 crosses over from the last bits or register 34c to the first bits of register 34a. In a similar manner, input register 28 reloads registers 34b,c before row selector 40 returns for more bits.

Simultaneously, row selector 42 selects four bits at a time from registers 36a,b,c. Because the data in registers 36a,b,c are delayed by delay buffer 30 for one scan line, the-bits selected by row selector 42 represent the pels immediately above the pels represented by the bits selected by row selector 40. As row selector 42 proceeds through registers 36a,b,c first delay buffer 30 loads new bytes of input scan data into registers 36a,b,c.

In the same manner, row selector 44 selects four bits at a time from registers 38a,b,c. As each register is exhaused, row selector 44 moves to the next. Second delay buffer 32 transmits bytes of raster scan data by line 60 to reload registers 38a,b,c. The four bits of data selected by row selector 44 are delayed by second delay buffer 32 for 420 bytes cycles more than the data selected by row selector 42. Therefore, the pels represented by the bits which are selected by row selector 44 are on the row immediately above the pels represented by the data selected by row selector 42. Each row selector 40, 42, 44 selects from three registers. While three is believed to be optimum number of registers, it is known that two or more are required.

Figure 6:
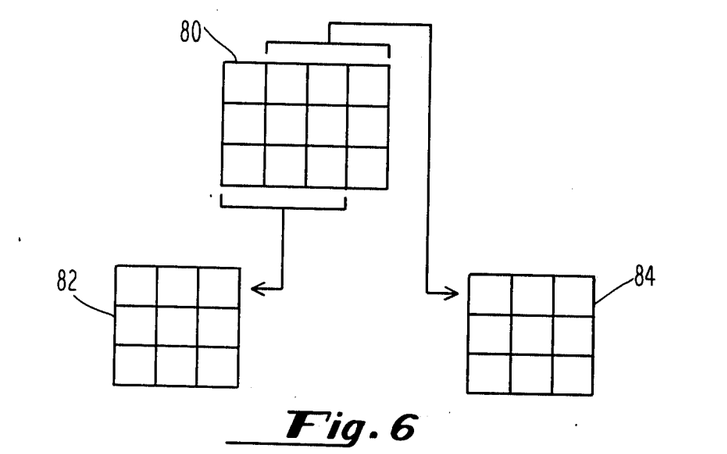
FIG. 6 shows in diagramatic form the output of the frame generator of FIG. 5.

Thus the bits selected by row selectors 40, 42, 44 of frame selector 26 form a 4×3 window 80 as shown in FIG. 6 which shows the output of frame generator 26. This output, window 80, is a window of the image represented by the raster scan data. Row selector 40 selects the bottom row of array 80. Row selector 42 selects data which is delayed by one raster scan thereby selecting the middle row of window 80, and row selector 44 selects the top row. This permits frame generator 26 to transmit to window decoder 46 of look up table 27 a 3×3 window 82 which is composed of the first three columns of window 80. Frame generator 26 thus spatially associates the serial data received by input register 28.

The first three ot the four bits selected by row selector 40 are therefore transmitted to window decoder 46 through lines 62, 63. These three bits represent the bottom row of window 82. In the same manner, row selector 42 transmits the first three of its four bits to window decoder 46 through lines 64, 65 forming the middle row of window 82. Row selector 44 transmits the first three of the four bits it selected to window decoder 46 by lines 66, 67 forming the first row of window 82.

Window 82 within window decoder 46 is thus a 3×3 window of bits each bit representing a pel. Each bit may be on or off indicating that the pel which it represents is filled or unfilled. Window 82 represents a pel pattern which may be enhanced as previously described for array 20. The enhancement may be performed by using the bits of window 82 to access a 512×2 ROM look up table or a programmable logic array within window decoder 46 which contains the predetermined intensity of the enhanced pel for the pel pattern represented by window 82. Programmable logic arrays are preferred because they allow faster access to the intensity information.

This predetermined intensity is determined by the assumed boundary line 22 associated with the pel pattern of window 82 and is approximately equal to the percentage of the center pel which lies to the right of assumed line 22. In this manner an array 82 is matched with one of the valid pel patterns of FIGS. 3A-Q, 4A-Q and an intensity is determined for the center pel. Arrays which do not correspond to any of the valid array patterns are passed through window decoder 46 unenhanced. Thus the angle and the placement of assumed boundary line 22 and the determination of the pel intensity may be simplified for a 3×3 array by deriving a look up table which may be accessed using bit pattern from frame generator 26.

When a ROM look up table is used in decoder 46, the nine bits which are received from row decoders 40,42,44, and which represent a pel pattern of an array 20, are received by the address lines of the ROM. The contents of the location addressed is intensity information for the center pel of the array 20. This intensity information is the percentage of full intensity which is determined by positioning assumed line 22 to bisect the center pel as previously described. Thus, accessing the contents of the ROM is, in effect, a comparison of the array represented by window 82 with the predetermined arrays of FIGS. 3A-Q, 4A-Q, for example.

When an array 20 which is not to be enhanced is applied to decoder 46, the intensity information accessed indicates an intensity which is the same as the unenhanced intensity. Thus, all possible pel patterns cause decoder 46 to output bits onto decoder output lines 68,70. But only for the pel patterns to be enhanced do the output bits indicate an intensity other than the unenhanced intensity. In a similar manner, a programmable logic array may be programmed to output the same two bits of intensity information a the ROM for each pel pattern.

Window decoder 46 thus processes one 3×3 array formed by row selectors 40, 42, 44 of frame generator 26. In the preferred embodiment a second 3×3 window may be processed simultaneously thereby doubling the speed of the processing of input raster data. To permit this increase in procsssing speed, window decoder 48 also receives data irom row selectors 40, 42, 44. Row selector 40 transmits four bits of data on line 62. The first three bits, bits 1,2,3, are received by window decoder 46 over line 63. Simultaneously, the last three bits, overlapping bits 2,3,4, are received by window decoder 48 through line 69 and form the bottom row of window 84 as shown in FIG. 6.

In a similar manner, the last three bits of data transmitted by row selector 42 are received by window decoder 48 to form the middle row of window 84 and the last three bits of the data transmitted by row selector 44 through line 66 are received by window decoder 48 to form the top row of window 84. It is for this reason that row selectors 40,42,44 skip a bit when selecting data from their registers.

Thus window 80 is divided into two overlapping windows 82, 84 which may be processed separately. It will be seen by those skilled in the art that the number of window decoders and the number of bits selected by row selectors may be varied to process a single pel at a time or to perform parallel processing of any number of pels. The manner of decoding within window decoder 48 or any additional window decoders may be the same as that of window decoder 46.

Window decoder 46 outputs the intensity information corresponding to the received bit patterns on lines 68, 70. Lines 68, 70 are 1 bit wide, thereby permitting four levels of intensity. For example, 00 may indicate an unfilled pel, 01 may indicate one-third intensity, 10 may indicate two-thirds intensity, and 11 may indicate a filled pel. The percentage intensity determined using assumed boundary line 22 is approximated with the closest of these four levels. For example, a pel which is seventy percent to the right of assumed boundary line 22 may be printed at two-thirds intensity.

In the 3×3 edge image example, this process alters the intensity of the center bit in 16 arrays out or the 512 possible pel patterns. These 16 arrays are those shown in FIGS. 4A-Q. In these arrays, if the center pel is filled, decoders 46,48 select two-thirds intensity. If the center pel is unfilled, one-third intensity is selected.

This is shown in Table 1 which lists a portion of a ROM look up table which may be used in decoders 46, 48. Table 1, contains only the entries for the pel patterns of FIGS. 4A-Q, the 16 arrays which are modified in the 3×3 edge image example. The ROM addresses are formed by representing a filled pel with a 1 and an unfilled pel with a zero and proceeding through the pel pattern from left to right and from top to bottom. Thus P1,1 is high order bit, P1,2 is the next highest order bit and P3,3 is the low order bit.

TABLE 1

| Address | Intensity Information |
|---|---|
| 000011111 | 10 |
| 000001111 | 01 |
| 001011011 | 10 |
| 001001011 | 01 |
| 011011001 | 10 |
| 011001001 | 01 |
| 111011000 | 10 |
| 111001000 | 01 |

TABLE 1-continued

| Address | Intensity Information |
|---|---|
| 111110000 | 10 |
| 111100000 | 01 |
| 110110100 | 10 |
| 110100100 | 01 |
| 100110110 | 10 |
| 100100110 | 01 |
| 000110111 | 10 |
| 000100111 | 01 |

For all pel patterns other than the 16 shown in Table 2, the intensity information from the ROM look up table of decoders 46, 48 is 11 if the center pel is filled before enhancement or 00 if the center pel is unfilled before enhancement.

The high order bit of the intensity indicia is transmitted by decoder 46 through line 70 to parallel to serial converter 52. The low order bit is transmitted by line 68 to parallel to serial-converter 50. Simultaneously, the high order bit of intensity indicia from window decoder 48 is transmitted to converter 52 on line 74 and the low order bit is communicated by line 72 to converter 50. Parallel to serial converters 50, 52 therefore each receive two bits of parallel data at a time as input and each provides a single serialized data output stream. Thus information on two raster scan bits are transmitted to converters 50, 52 simultaneously. This information including filled, unfilled and modified indicia, is transmitted by converters 50,52 in a serial manner. However the indicia are spatially associable as previously described for frame generator 26.

Converters 50, 52 transmit the enhanced raster scan data of an image 13 to output port 54 which may be coupled to a laser driver, a driver for a video display tube or any visual display device, such as image display 11, which requires a serial data stream and generates pels or pixels in response to the serial data stream. For example, quality enhancement data flow 29 may be used to convert data and enhance the quality of the image produced by a printer described in U.S. Pat. No. 4,031,519 issued to Findley and hereby incorporated by reference, in which a laser beam writes dot patterns of varying intensity in response to pel-indicating indicia. The binary input thus may modify the intensity or reflectance of the printed pels by modulating the beam produced by the laser to form a printed image having intermediate or gray levels at selected points on the edges between foreground and background. This enhancement permits a printer to print graphics at an apparent resolution higher than the capacity of the machine.

While the invention has been particularly shown and described with reference to a preferred embodiment thereof, it will be understood by those skilled in the art that various changes in form and details may be made therein without departing from the spirit and scope of the invention.

In data flow 29, FIG. 5, the following components may be used for the operation and function as described and shown.

| Reference Numeral | Type |
|---|---|
| 40, 42, 44 | 74150 (4X), 74S163 |
| 34a,b,c, 36a,b,c 38a,b,c | 74LS244 |

| Reference Numeral | Type |
|---|---|
| 46, 48 | 74PL839 |

I claim:

1. A method for improving the quality of raster imaging in which the image is represented by a plurality of selected square arrays of filled pels forming a filled pel area and unfilled pels forming an unfilled pel area, each square array having an edge between the filled pel area and the unfilled pel area and containing at least nine pels, comprising the steps of:
  (a) establishing a 0° set of arrays having at least the top row compeltely unfilled and in which a 0° line is formed by an edge of the filled pel area which is parallel to a horizontal line of the array,
  (b) establishing a 45° set of arrays in which a 45° line is formed by the edge of the filled pel area parallel to a diagonal of each array,
  (c) establishing for a first intermediate set of arrays at least one line having a predetermined angle intermediate between said 0° and said 45° lines and having a top unfilled row and a bottom filled row and an intermediate row having at least the same number of filled pels from row to row downwardly,
  (d) transposing the first intermediate set and its associated line about a vertical line and rotating the transposed first intermediate set 90° to provide a second intermediate set of arrays each having an associated line intermediate between said 45° line and the vertical line of the array,
  (e) rotating the (1)0°, (2)45°, (3) first intermediate, and (4) second intermediate sets of arrays and the associated lines of each set in a sequence of 90° rotations to provide respectively (1) sets of arrays having associated lines of 90°, 180°, and 270° with respect to the horizontal, (2) sets of arrays having associated lines of 135°, 225°, and 315° with respect to the horizontal, (3) third intermediate and (4) fourth intermediate sets of arrays each having associated lines,
  (f) selecting square arrays representing the image, each selected array having an odd number of pels,
  (g) comparing each selected array with the sets of arrays to seek a match of a selected array with a particular set, and
  (h) determining a pel intensity for the center pel of each selected array having a match in accordance with the angle of the line associated with the matched set.

2. The method of claim 1 in which step (f) includes the steps of:
  positioning the line associated with the matched array at its respective angle to bisect the top edge of the center pel of the selected array to form bisected pel portions,
  determining the percentage of the total pel area formed by the bisected pel portion adjacent the filled area, and
  determining a pel intensity for the center pel of each selected array in accordance with the determined percentage area.

3. The method of claim 2 including the step of varying the positioning of the line to the left and right while maintaining the bisection of the top edge of the center pel.

4. The method of claim 1 in which steps (d) and (e) include 90° counterclockwise rotations of the sets of arrays.

5. The method of claim 1 in which step (b) includes establishing arrays in which the parallel line of the filled pel area lies between the diagonal and the horizontal edge of the array.

6. The method of claim 1 in which the image is a line image having unfilled pel portions on two sides of a filled pel portion including positioning a line having a non-zero width and determining the percentage of the total pel area which overlaps with the line and determining a pel intensity in accordance with the overlapped percentage.

7. The method of claim 1 in which step (e) includes providing third intermediate sets having angles intermediate between 90° and 135°, between 180° and 225°, and between 270° and 315° for respective rotations of the first intermediate set of arrays and fourth intermediate sets having angles intermediate between 135° and 180°, between 225° and 270°, and between 315° and 0° for respective rotations of the second intermediate set of arrays.

8. The method of claim 1 which includes determining a pel intensity which is one of a plurality of pel intensities intermediate between filled pel intensity and unfilled pel intensity.

9. The method of claim 1 in which each of the sets of arrays is rotated an additional 90°.

10. In a method for a visual display of graphic pel patterns representated by arrays of foreground and background pels, the improvements including the steps of:
  (a) first establishing predetermined relationships between pel patterns and respective associated assumed lines wherein the associated assumed line of a pel pattern is substantially similar to a boundary line between foreground and background pels within the pel pattern;
  (b) second establishing a predetermined relationship between each assumed line and an associated pel intensity;
  (c) selecting a square array having a pel pattern of foreground and background pels such that both foreground and background pels occur in said selected array;
  (d) comparing the pel pattern of the selected array with the pel patterns having associated assumed lines;
  (e) determining a match between the pel pattern of the selected array and one of the pel patterns having an associated assumed line thereby establishing an assumed line for the selected array only in response to the match;
  (f) selecting the pel intensity associated with the established assumed line;
  (g) modifying the intensity of a pel within the selected array in response to the selected pel intensity; and
  (h) generating pels with said foreground, background and modified intensities.

11. The method of claim 10 in which step (d) includes selecting a pel to be modified within the selected array and positioning the established assumed line to bisect the selected pel.

12. The method of claim 11 in which the step of selecting a pel to be modified includes selecting the center pel of the selected array.

13. The method of claim 10 in which the selected array contains at least nine pels and step (c) includes establishing an assumed line having a first angle of zero degrees for a selected array having a completely unfilled top row in which the edge of the filled pel area is parallel to the horizontal line of the array, a second angle of 45° for a selected array in which the filled pel area is parallel to the diagonal of the array, a third angle intermediate the first and second angles for a selected array having a top unfilled row, a bottom filled row and an intermediate row having at least one filled pel, and a fourth angle established by transposing the arrays of the third angle about a vertical line add rotating them 90° counterclockwise.

14. The method of claim 13 including the further step of rotating in a sequence of 90° counterclockwise rotations the selected arrays having boundary lines with the first, second, third and fourth angles.

15. The method of claim 14 in which steps (d) and (f) include:
(a) comparing the selected array with the first, second, third, fourth angles and the arrays produced by rotation and transposition to provide the matched array, thereby determining a matched angle,
(b) positioning the associated assumed line having the matched angle to bisect the top edge of the center pel of the selected array to form bisected pel portions,
(c) determining the percentage of the total pel area formed by the bisected pel portion adjacent the foreground, and
(d) determining a pel intensity related to the determined percentage.

16. The method of claim 10 in which step (f) includes selecting one of a plurality of pel intensities intermediate the intensity of the foreground pels and the intensity of the background pels.

17. The method of claim 10 wherein step (c) includes the steps of:
receiving raster scan data in a scan data register;
first delaying the scan data to provide first delayed data and second delaying the first delayed data to provide second delayed data; and
selecting a first row of the square array from the scan data, selecting a second row of the square array from the first delayed data, and selecting a third row of the square array from the second delayed data.

18. The method of claim 17 in which step (g) includes indicating modified pel intensity in response to said rows.

* * * * *

UNITED STATES PATENT AND TRADEMARK OFFICE
CERTIFICATE OF CORRECTION

PATENT NO. : 4,780,711

DATED : October 25, 1988

INVENTOR(S) : William M. Doumas

Figure 4:
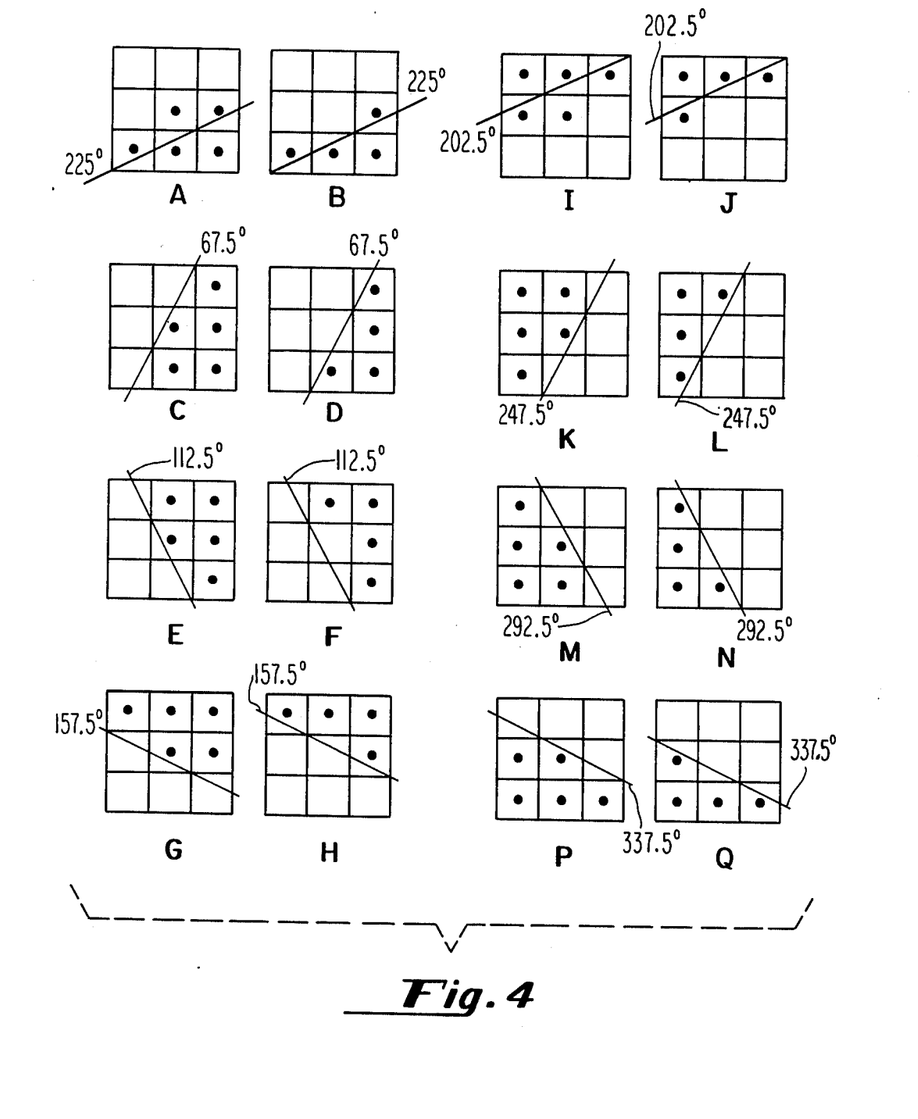

It is certified that error appears in the above-identified patent and that said Letters Patent is hereby corrected as shown below:

In the drawings, Fig. 4 should be replaced with the following drawing.

Fig. 4

Signed and Sealed this

Twenty-seventh Day of June, 1989

Attest:

DONALD J. QUIGG

Attesting Officer

Commissioner of Patents and Trademarks